United States Patent [19]

Lin

[11] Patent Number: 6,094,341
[45] Date of Patent: Jul. 25, 2000

[54] NOTEBOOK COMPUTER

[76] Inventor: Hui Lin, 7F., No. 76, Chung Shiao E. Rd., Taipei, Taiwan

[21] Appl. No.: 09/111,748

[22] Filed: Jul. 8, 1998

[51] Int. Cl.[7] ........................................................ G06F 1/16
[52] U.S. Cl. ................................ 361/681; 345/905; 70/58
[58] Field of Search ......................... 361/681; 364/708.1; 349/58; 345/905, 168, 169

[56] References Cited

U.S. PATENT DOCUMENTS

| | | | |
|---|---|---|---|
| 5,260,885 | 11/1993 | Ma ........................................ | 364/708.1 |
| 5,383,138 | 1/1995 | Motoyama et al. .................. | 364/708.1 |
| 5,465,191 | 11/1995 | Nomura et al. ....................... | 361/681 |
| 5,777,704 | 7/1998 | Selker .................................... | 349/58 |
| 5,796,577 | 8/1998 | Ouchi et al. .......................... | 361/681 |
| 5,900,848 | 5/1999 | Haneda et al. ....................... | 361/681 |

*Primary Examiner*—Leo P. Picard
*Assistant Examiner*—John D. Reed
*Attorney, Agent, or Firm*—Pro-Techtor International Services

[57] ABSTRACT

A notebook computer with folded dual-display wherein the computer body is pivoted with a first display and the first display is pivoted with a second display thereby the first and the second displays can be folded to each other or be expanded and the first display can cover the computer body, and the computer body is provided to a case body having a rack inside it thereby, after the first and the second displays are opened, a margin of the second display can be placed against the rack to adjust simultaneously the tilt angles of the first and the second displays is disclosed. According to the invention, plural persons can see the image on the displays at the same time.

5 Claims, 3 Drawing Sheets

NOTEBOOK COMPUTER

BACKGROUND OF THE INVENTION

The invention relates to a notebook computer with folded dual-display, in particular, to that having two displays, which can be folded to each other at any tilt angles such that the images thereon can be viewed simultaneously by plural persons at different positions.

The development of information technology makes the prosperous progressive in the computer industry. Personal computers (PCs) are the most popular computer product and have broad application at home and office. Compared to the large-size computers used decades ago, recent PCs have comparable performance with much smaller size. However, from the viewpoint of portability, recent PCs still have too much weight to be taken easily. On the other hand, desktop computers are powered through sockets and this is the major disadvantage to carry them freely. Therefore, there is a need of notebook computers. The portability requirements for notebook computers are less weight and compact size. However, owing to the limitation of its size, notebook computers use liquid-crystal displays as the display instead of the CRTs used in the desktop ones. Though liquid-crystal display shows images in soft quality, the images become unclear if the viewer views the images from an improper angle, in particular, in the situation where plural viewers have to see the image at the same time. In addition, for one-to-one computer instruction or discussion between colleagues and classmates, it always happens that two persons are crowded in front of one display to see the image thereon, accordingly an uncomfortable feeling inevitably occurs. The invention is thus provided to improve the above disadvantages of the conventional notebook computers.

SUMMARY OF THE INVENTION

An object of the invention is to provide a notebook computer with folded dual-display wherein the computer is provided with two displays arranged at opposite direction when the two displays are opened such that plural persons can see the same image at the same time. Further, the two displays can be folded into the computer body to reduce the size of the whole body such that the portability of the notebook computer will not be affected.

A further object of the invention is to provide a notebook computer with folded dual-display wherein the two displays can be engaged to each other as being folded to reach an engaged and fastened state.

A still further object of the invention is to provide a notebook computer with folded dual-display wherein the two displays can be adjusted with respect to their tilt angles such that more comfortable viewing feelings to the viewers can be obtained.

Based on the forgoing, the invention provides a notebook computer with folded dual-display comprising:
a first display pivoted to a computer body, and
a second display pivoted to the first display thereby the first and the second displays can be folded or expanded and the first display can cover the computer body;
Wherein the computer body is provided to a case body formed by pivoting a case base and a case cover, the inside of the case cover is provided with a rack thereby, after the first and second displays are opened, a margin of the second display can be placed against the rack to adjust simultaneously both the tilt angles of the first and second displays such that plural persons can see the image on the displays at the same time.

The other objects and effects of the invention will be described more detailedly by referring to the following figures.

DETAILED DESCRIPTION OF PREFERRED EMBODIMENT

Figure 1:
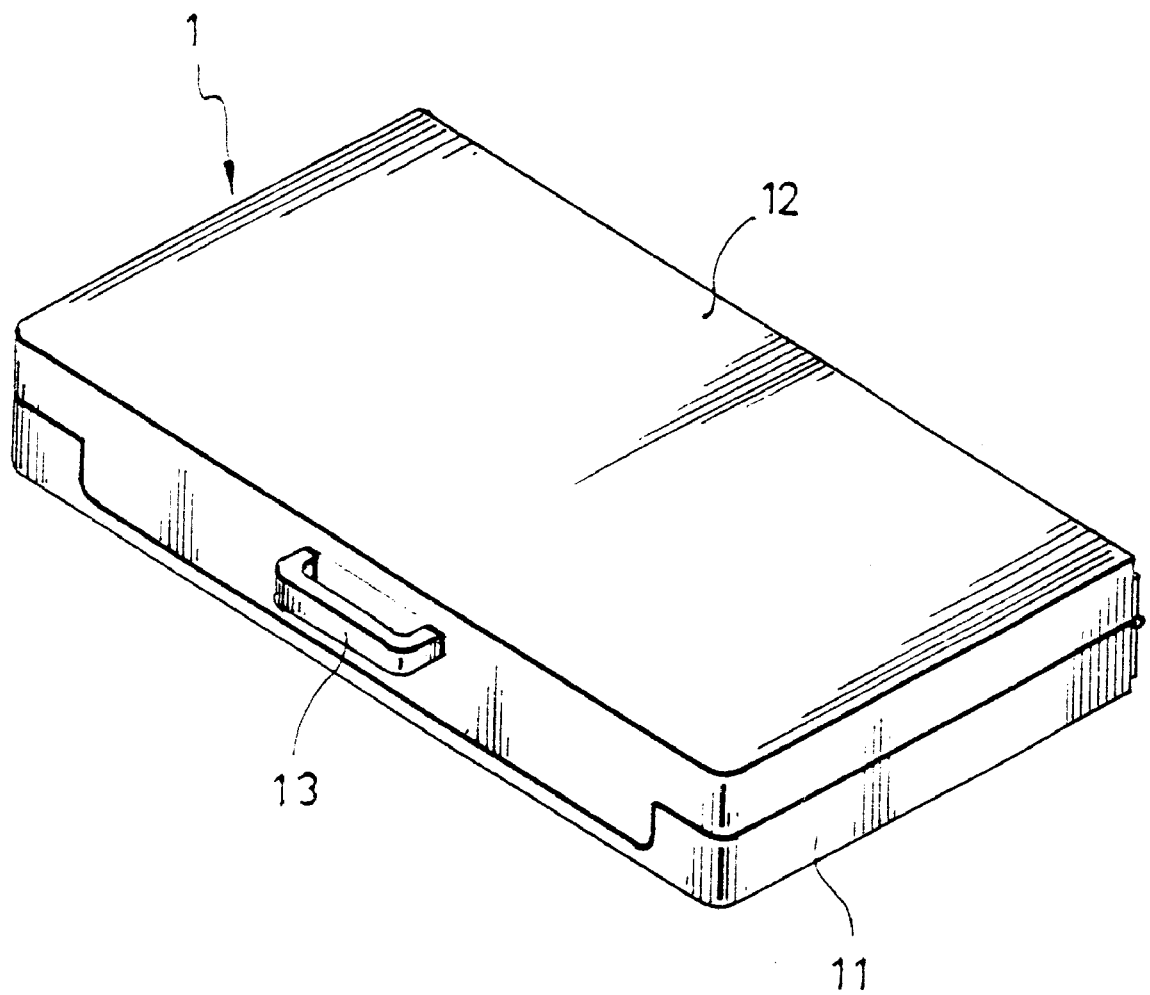
FIG. 1 is a perspective view of the closed state of the whole notebook computer of the invention.
Figure 2:
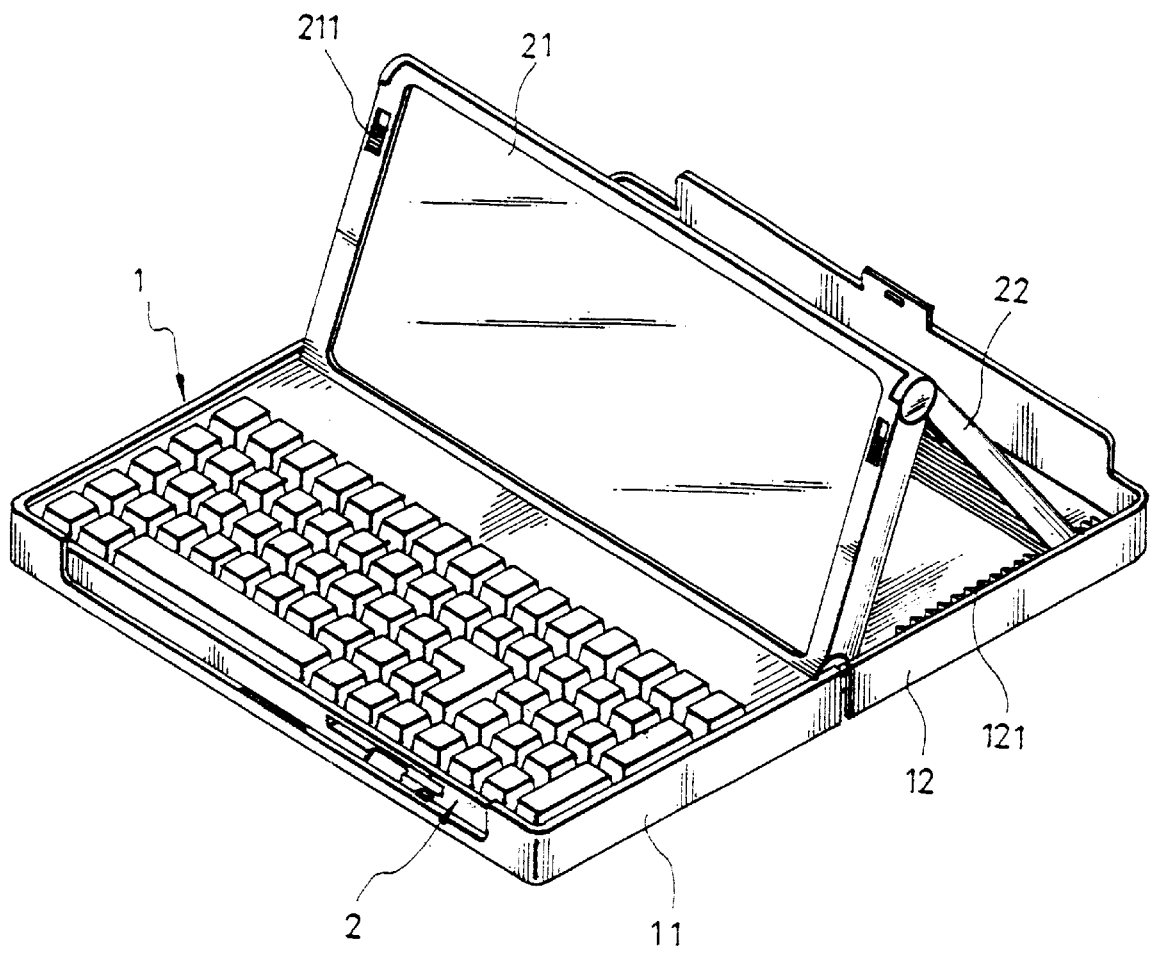
FIG. 2 is a perspective view of the opened state of the notebook computer of the invention.
Figure 3:
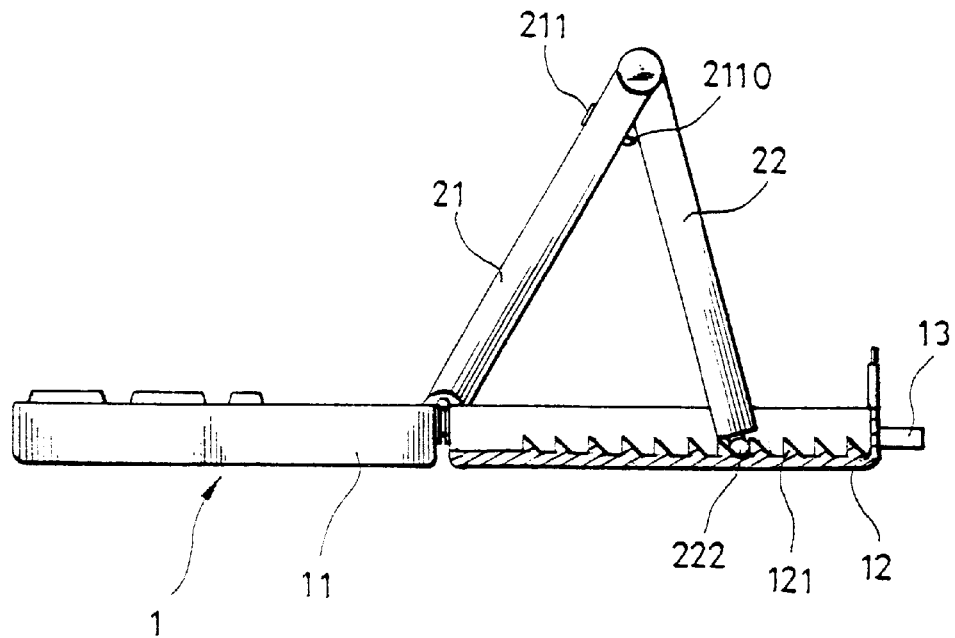
FIG. 3 is a planar view of the structure for adjusting the tilt angles of the displays.
Figure 4:
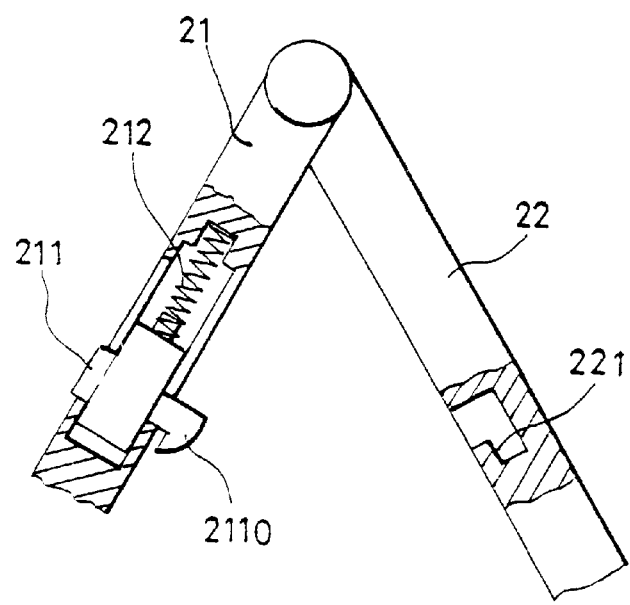
FIG. 4 is a cross section view of the structure for engaging the first and second displays.

As shown in FIG. 2, the notebook computer with folded dual-display according to the invention comprises a case body 1 and a notebook computer wherein the case body 1 consists of a case base 11 and a case cover 12 which are pivoted together. Inside the case cover 12, there are provided with racks 121 at the opposite sides of the case cover, respectively, and the teeth portion of the rack 121 is in the shape of reverse hook. Outside the case cover 12, there is provided with a handle 13. An engaging means is provided between the case cover 12 and the case base 11 thereby the case base 11 and the case cover 12 is fastened together through the engaging means when the case cover 12 covers the case base 11. In the notebook computer, the computer body 2 is permanently placed in the case base 11 in the manner that the keyboard of the computer body 2 faces upwardly. The computer body 2 is pivoted with a first display 21 and the first display 21 is pivoted with a second display 22 wherein each side of the body of the first display 21 is provided with a slot having a latch piece 211 therein. The latch piece 211 has a projection part on one end and a hook 2110 on one side. The projection part is engaged with an elastic element 212 and then the latch piece 211 is placed into the slot to let the elastic element 212 acts on the latch piece 211 and the slot. The elastic strength produced by the elastic element 212 makes the hook 2110 of the latch piece 211 have a power of spontaneous engagement. An engaging slot 221 is provided to the body of the second display 22 at the position corresponding to the hook 2110 thereby the hook 2110 engages spontaneously to the margin of the engaging slot 221 to reach a fastened state when the first display 21 and the second display 22 are folded. Accordingly, the first display 21 and the second display 22 together cover the computer body 2. Thereafter, close the case cover 12 onto the case base 11 and engage it thereto so as to make the computer portable. Upon pushing the latch piece 211, the hook 2110 is released from the engaged state with the engaging slot and therefore the first display 21 and the second display 22 are opened. Further, a margin of the second display 22 is provided with a rod-shaped stopper 222 thereby, after the second display 22 is opened, the stopper 222 can be placed against any tooth of the rack 121 to reach a fixed state. Also, the tilt angles of the first display 21 and the second display 22 can be adjusted by changing the position of the stopper 222 against other teeth such that plural persons at opposite positions can see the image on the displays at the same time. To sum up, the invention is useful and fulfills the statutory requirements for a utility invention.

The above description is used to illustrate the embodiments of the invention but is not in any way limited thereto. Any modification or variation within the spirit of the invention is intended to be included in the scope of the invention.

What is claimed is:

1. A notebook computer with folded dual-display, comprising a case body consisting of a case base and a case cover pivoted together wherein the inside of the case cover is provided with a rack; and a notebook computer provided to the case base of the case body, wherein the computer body is pivoted with a first display and the first display is pivoted with a second display, a margin of the second display is provided with a stopper thereby either the first and the second displays can be folded to let the first display cover the computer body or the first and the second displays can be expanded and the stopper of the second display can be placed against the rack to adjust simultaneously the tilt angles of the first and the second displays such that plural persons can see the image on the displays at the same time.

2. The notebook computer with folded dual-display as claimed in claim 1 wherein the first display is provided with plural slots and the slot is provided with a latch piece having a hook in the manner that the hook penetrates the body of the first display thereby the movement of the hook is controlled by pushing the latch piece, and an engaging slot is provided to the body of the second display at a corresponding position thereby the hook can be engaged to the engaging slot to reach a fastened state as the first and the second displays are folded.

3. The notebook computer with folded dual-display as claimed in claim 2 wherein an elastic element is provided between the latch piece and the slot of the first display thereby the hook can be engaged to the engaging slot spontaneously as the first and the second displays are folded.

4. The notebook computer with folded dual-display as claimed in claim 1 wherein the rack has teeth in the shape of reverse hook.

5. The notebook computer with folded dual-display as claimed in claim 1 wherein a handle is provided to the case body.

* * * * *